United States Patent
Hsu

(10) Patent No.: US 7,316,618 B2
(45) Date of Patent: Jan. 8, 2008

(54) STEERING WHEEL CONTROLLER FOR USE WITH EMBEDDED PORTABLE GAME SYSTEM

(75) Inventor: Wei Hsu, Taipei Hsien (TW)

(73) Assignee: Weistech Technology Co., Ltd., Jhonghe, Taipei County (TW)

( * ) Notice: Subject to any disclaimer, the term of this patent is extended or adjusted under 35 U.S.C. 154(b) by 365 days.

(21) Appl. No.: 11/165,515

(22) Filed: Jun. 24, 2005

(65) Prior Publication Data

US 2006/0258452 A1   Nov. 16, 2006

(30) Foreign Application Priority Data

May 16, 2005   (TW) ............................... 94207900 U

(51) Int. Cl.
*A63F 13/00* (2006.01)

(52) U.S. Cl. ............................ 463/37; 463/36; 463/37; 463/38; 273/148 B; 273/442; 434/45; 434/62; 345/156

(58) Field of Classification Search .................. 463/37, 463/36, 38; 273/148 B, 442; 434/45, 62; 345/156
See application file for complete search history.

(56) References Cited

U.S. PATENT DOCUMENTS

| | | | | |
|---|---|---|---|---|
| 5,044,956 A * | 9/1991 | Behensky et al. | ............ | 434/45 |
| 5,056,787 A * | 10/1991 | Mitsuyoshi | ............ | 273/148 B |
| 5,823,876 A * | 10/1998 | Unbehand | .................. | 463/37 |
| 5,829,745 A * | 11/1998 | Houle | .................. | 273/148 B |
| 5,989,123 A * | 11/1999 | Tosaki et al. | ................. | 463/37 |
| 6,020,875 A * | 2/2000 | Moore et al. | ............... | 345/156 |
| 6,050,897 A * | 4/2000 | Suzuki et al. | ................. | 463/37 |
| 6,159,099 A * | 12/2000 | Chen | ........................ | 463/37 |
| 6,279,906 B1* | 8/2001 | Sanderson et al. | ...... | 273/148 B |
| 6,530,570 B2* | 3/2003 | Ku | ........................ | 273/148 B |
| 6,544,124 B2* | 4/2003 | Ireland et al. | ................ | 463/37 |
| 6,811,491 B1* | 11/2004 | Levenberg et al. | ........... | 463/47 |
| 6,976,677 B1* | 12/2005 | McVicar | ................. | 273/148 B |
| 2001/0046897 A1* | 11/2001 | Hagiwara et al. | ............. | 463/37 |
| 2001/0049302 A1* | 12/2001 | Hagiwara et al. | ............. | 463/37 |
| 2002/0142838 A1* | 10/2002 | Russell | ....................... | 463/37 |
| 2006/0279039 A1* | 12/2006 | Krieger et al. | .......... | 273/148 B |

* cited by examiner

*Primary Examiner*—John M. Hotaling, II
*Assistant Examiner*—Christopher H Bond

(57) ABSTRACT

A controller of a portable game machine comprises a steering wheel having a body and a rotary unit; a base for locating a portable game machine; a supporting frame for supporting the seat to the steering wheel; and a steering wheel seat for supporting the rotary unit of the steering wheel to a body. The piezoelectric switch is placed on the base, by mechanic linear power transfer, functions of the portable game machine is controlled by operation the steering wheel. By levers to transfer power, the function keys of the steering wheel are corresponding to function keys of the portable game machine.

8 Claims, 2 Drawing Sheets

STEERING WHEEL CONTROLLER FOR USE WITH EMBEDDED PORTABLE GAME SYSTEM

FIELD OF THE INVENTION

The present invention relates to portable game machines, and in particularly to a controller used for a portable game machine, wherein the controller has a steel wheel so that the actions of the functions keys of the game machine can be changed as the action of the steel wheel of the controller. The power transfer of the controller to the portable game machine is achieved mechanically without needing electric power.

BACKGROUND OF THE INVENTION

Generally, the game machines are quipped with handlebar controller in selling, but no steering wheel is equipped. In some games, such as automobile or car racing game, the steering wheel is a convenient tool for operation, but frequently, the users use handlebars as controllers. This is very inconvenient.

SUMMARY OF THE INVENTION

Accordingly, the primary object of the present invention is to provide a controller used for a portable game machine, wherein the controller has a steel wheel so that the actions of the functions keys of the game machine can be changed as the action of the steel wheel of the controller. The power transfer of the controller to the portable game machine is achieved mechanically without needing electric power.

To achieve above objects, the present invention provides A controller of a portable game machine comprises a steering wheel having a body and a rotary unit; a base for locating a portable game machine; a supporting frame for supporting the seat to the steering wheel; and a steering wheel seat for supporting the rotary unit of the steering wheel to a body. The piezoelectric switch is placed on the base, by mechanic linear power transfer, functions of the portable game machine is controlled by operating the steering wheel. By levers to transfer power, the function keys of the steering wheel are corresponding to function keys of the portable game machine.

The various objects and advantages of the present invention will be more readily understood from the following detailed description when read in conjunction with the appended drawing.

DETAILED DESCRIPTION OF THE INVENTION

Figure 1:
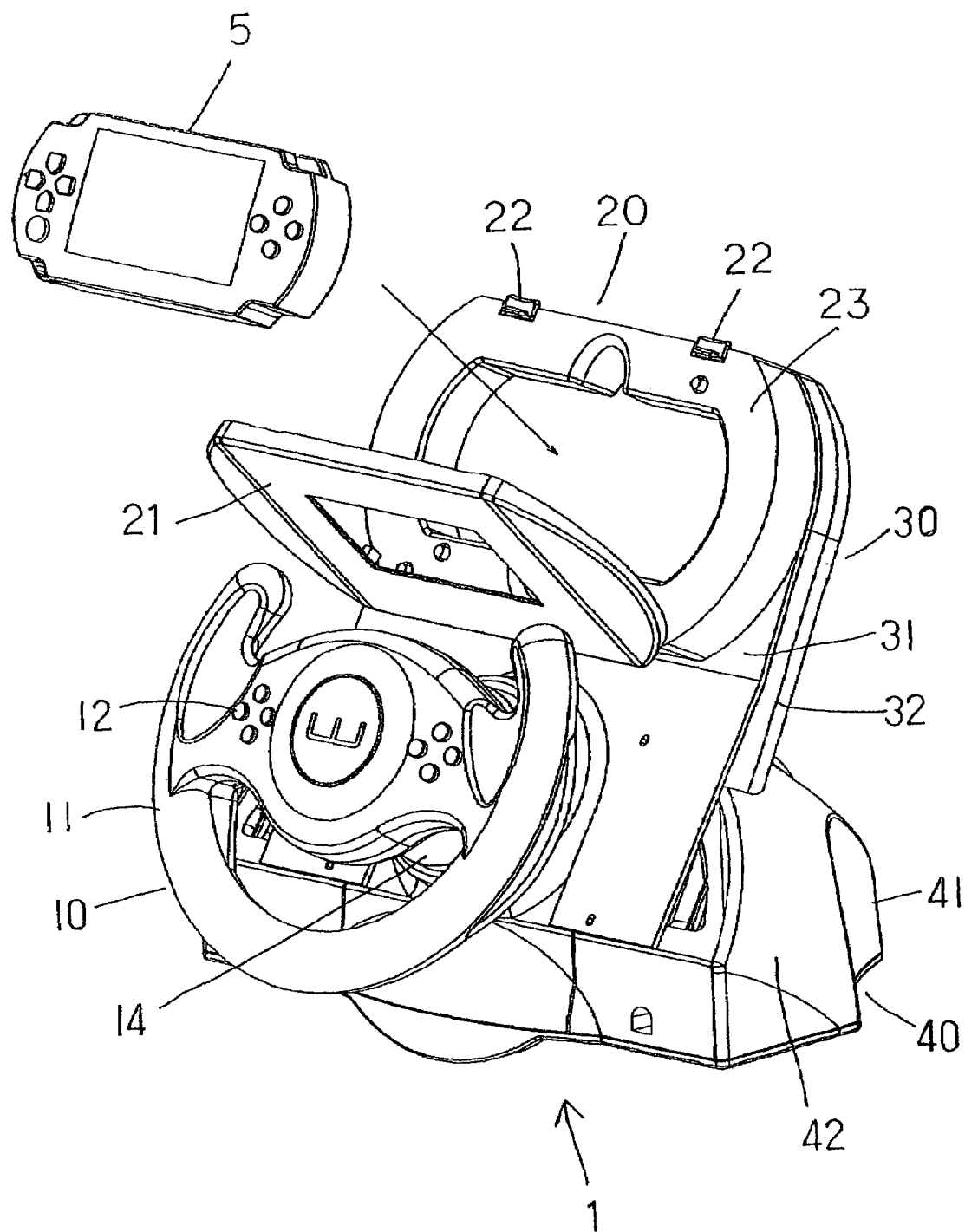
FIG. 1 is an exploded perspective view of the embodiment of the present invention.

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Referring to the drawings, the controller of a portable game machine of the present invention is illustrated. The present invention has the following the elements.

A steering wheel 10 has a body 11, a function key unit 12, a liner power transfer unit 13 (not shown), and a rotary unit 14. In this the present invention, the body 11 is a plane steering wheel having a U shape, but it can has other shapes, for example, a round steering wheel. The function key unit 12 has a plurality of function keys distributed on a surface of the body 11 so that the user can control it smoothly.

The power transfer unit 13 serves to connect the function keys of a portable game machine 5 to the functions keys in the function key unit 12 of the body 11 by using transfer steel lines to connect the function keys of the functional key unit 12 to a base assembly 20 of the portable game machine 5. Furthermore, in the present invention, the power transfer unit includes one of gear power transfer sets, cam power transfer sets, inclined surface power transfer sets, lever power transfer sets, pneumatic power transfer sets and hydraulic power transfer sets.

The rotary unit 14 has a spindle, a rotation angle stop, and an angle actuating unit. The spindle is a hollow plastic shaft for accumulating the steel lines. The rotation angle stop serves to confine the rotation angle of the body 11. The angle actuating unit is a line transfer and pulley differential movement design.

The body 11 rotates through 120 degrees. A restoring spring is installed between the rotary unit 14 and a rotary unit supporter 42. The spring has a fixing sheet for fixing the steel lines and a flexible tube. The steel lines are wound around the spring. The rotation of the rotary unit 14 will drive the steel lines. The rotation angle stop is installed to the spring so as to confine the movement of the spring so as to confine the movement of the rotary unit.

A base 20 serves for placing the portable game machine 5 and for driving the function keys of the portable game machine 5. The base 20 has a display screen 21, a cover opening unit 22, and a receiving box 23. The display screen 21 is made of transparent material. The display screen 21 is a plane embedding type or has a frame. The cover opening unit 22 is used as a cover of the portable game machine 5. The cover opening unit 22 is installed with linkage levers. Preferably, the cover opening unit 22 is a shallow and thin structure (for example, a strengthened aluminum thin levers). The cover opening unit 22 can be opened by opening buckles or rotating a spindle. The receiving box 23 serves to receive the portable game machine 5. A periphery of the receiving box 23 is mounted with terminal transfer lines (or PSP levers).

A supporting frame assembly 30 for supporting the base of the portable game machine 5 to the steering wheel 10. The supporting frame assembly 30 is a fixed and undetachably structure. The assembly 30 has a supporting frame 31 and a rear cover 32. If the supporting frame assembly 30 is a detachable structure, it can be a bus. The supporting frame 31 is made of iron for increasing the strength of the structure and for balancing. The rear cover 32 serves for shielding the transfer unit 13. If it is detachable, it is a bus transfer unit, or a servo conductive wire or a transfer lever, or a driving gear set, etc.

The steering wheel seat 40 serves for supporting the rotary unit 14 and fixing the body. The steering wheel seat 40 has a casing 41, a rotary unit supporter 42, and a seat retainer 43. The casing 40 serves to enclose the steering wheel seat 40. The rotary unit supporter 42 serves to support the rotary unit 14 to the seat. The seat retainer 43 is for example, a rubber suction disk or a clamper.

Figure 2:
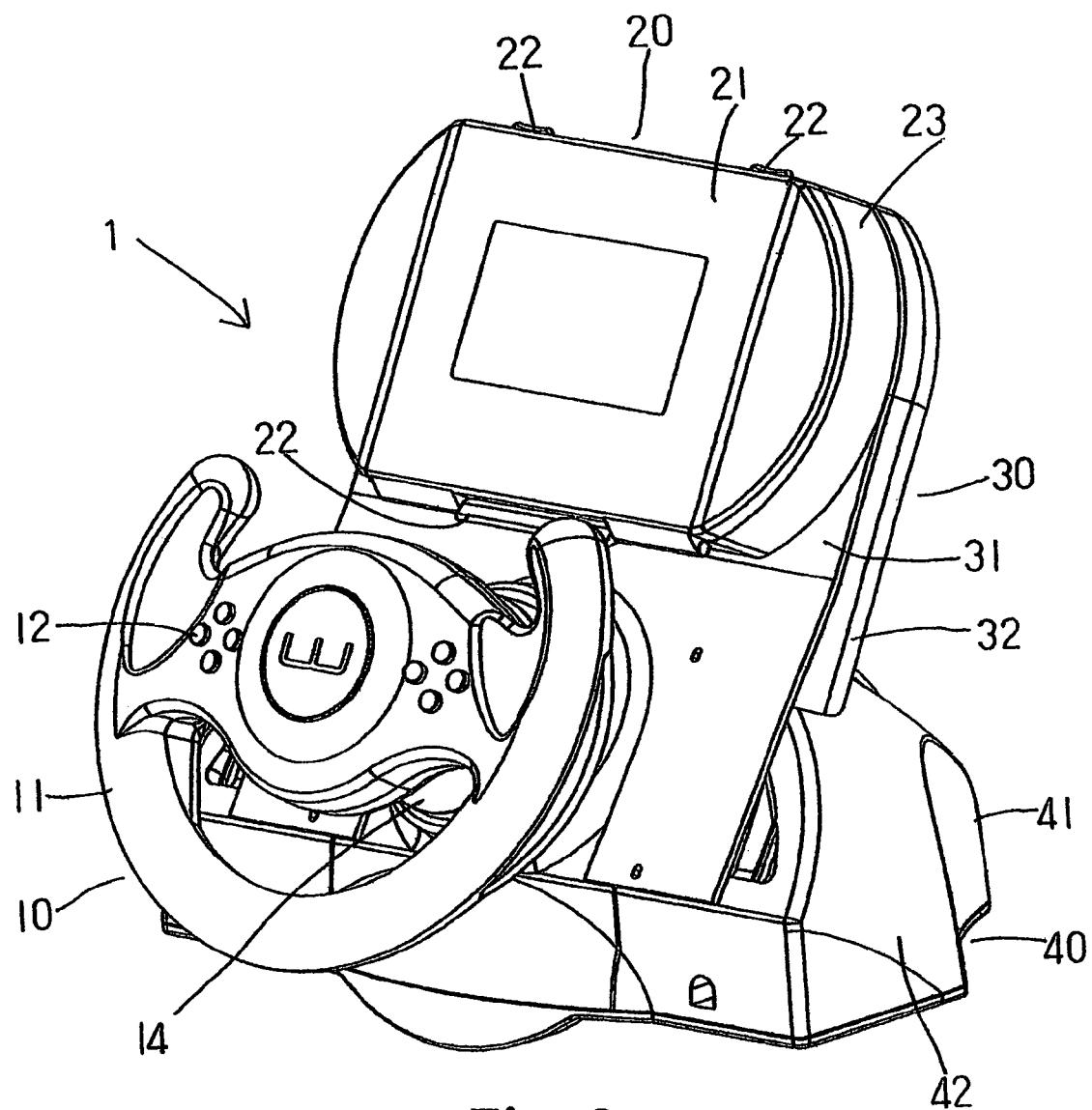
FIG. 2 is a perspective view of the embodiment of the present invention.

In use of the present invention, the portable game machine 5 is portable in various places. The controller 1 has the base 30. When the cover opening unit is operated, the portable game machine 5 is placed into the receiving box 23 and then the cover is closed and a screw rod is locked. As shown in FIG. 2.

In the steering wheel 10 of the controller 1 of the present invention, the control of pressing keys is changed as control the rotation of the steel wheel 10. This is achieved by a linear power transfer. The rotation of the steer wheel must be linked to the action of the keys of the portable game machine 5. For example, when the steer wheel 10 rotates leftwards, the action must be coupled to the keys for rotating leftwards, and vice versa. When an action of actuating the accelerator is performed in the controller, the action must be transferred to the key for acceleration in the game machine. When a braking action is performed in the controller, the action must be transferred to the key for braking in the game machine.

Moreover, the power transfer of the present invention does not need any electric power. The line power transfer is performed by inclined surfaces, levers, or direction change units, etc so as to change the direction of power transfer from the controller to the game machine. Thereby, many actions, such as turn leftwards, turn rightwards, accelerating, braking, illumination of lights (front lights, backlights, etc.) are performed by the controller of the present invention to control the game machine by using soft lines or hard mechanic tools.

Moreover, since generally the power of the portable game machine is chargeable, but the power stored is finite. Because the controller of the present invention is electric-powerless, it can save more power in the game machine so that the portable game machine has a longer time for use without charge. This is a benefit of the present invention.

The present invention is thus described, it will be obvious that the same may be varied in many ways. Such variations ate not to be regarded as a departure from the spirit and scope of the present invention, and all such modifications as would be obvious to one skilled in the art are intended to be included within the scope of the following claims.

What is claimed is:

1. A controller of a portable game machine comprising:
    a steering wheel having a body, a power transfer unit, a function key unit and a rotary unit
    a base for locating a portable game machine;
    a supporting frame for supporting the base to the steering wheel; and
    a steering wheel seat for supporting the rotary unit of the steering wheel to a body; and
    wherein when a portable game machine is located in the base, the functions of the portable game machine are linked to the function key units and the rotary unit of the steering wheel; by mechanic linear power transfer, functions of the portable game machine is controlled by operation the steering wheel.

2. The controller of a portable game machine as claimed in claim 1, wherein by levers to transfer power, the function keys of the steering wheel are corresponding to function keys of the portable game machine.

3. The controller of a portable game machine as claimed in claim 1, wherein the power transfer unit serves to connect the function keys of a portable game machine to the functions keys in the function key unit by using transfer steel lines to connect the function keys of the functional key unit to the base.

4. The controller of a portable game machine as claimed in claim 3, wherein the power transfer unit further includes one of gear power transfer sets, cam power transfer sets, inclined surface power transfer sets, lever power transfer sets, pneumatic power transfer sets and hydraulic power transfer sets.

5. The controller of a portable game machine as claimed in claim 1, wherein a restoring spring is installed between the rotary unit and a rotary unit supporter; the spring has a fixing sheet for fixing the steel lines and a flexible tube; the steel lines are wound around the spring; the rotation of the rotary unit will drive the steel lines; the rotation angle stop is installed to the spring so as to confine the movement of the spring so as to confine the movement of the rotary unit.

6. The controller of a portable game machine as claimed in claim 1, wherein the steering wheel has the body, a function key unit, a liner transfer mechanism, and the rotary unit.

7. The controller of a portable game machine as claimed in claim 1, wherein the base has a display screen, a cover opening unit, and a receiving box; wherein the display screen has a hollow surface for viewing the portable game machine.

8. The controller of a portable game machine as claimed in claim 1, wherein the steering wheel seat has a casing, a rotary unit supporter, and a seat retainer; the casing serves to enclose the steering wheel seat; the rotary unit supporter serves to support the rotary unit to the seat; and the seat retainer is made as a rubber suction disk or a clamper.

* * * * *